Patented Oct. 3, 1939

2,174,825

UNITED STATES PATENT OFFICE 2,174,825

RECOVERY OF ALUMINUM COMPOUNDS

Lucien Fréling and Jules Dorren, Heerlen, Netherlands

No Drawing. Application August 5, 1936, Serial No. 94,416. In the Netherlands August 10, 1935

2 Claims. (Cl. 23—141)

The invention relates to the recovery of aluminum compounds from the combustible products of coal mining. Such products comprise both actual coal, and the combustible waste materials obtained from the washing and screening of coal.

It is known that boiler ash has a content of aluminum oxide which often amounts to 30% and more. Extraction of the oxide from the ash, apart from smelting with soda or alkali-hydroxide, is only possible by means of hydrochloric acid with the use temperatures up to 200° C. and pressures of around 30 atmospheres, involving considerable difficulties and expense. Such extraction has for these reasons not come into practical use. Smelting of boiler ash with soda or alkali-hydroxides has also not come into practical use owing to the high expense of operation.

The above mentioned disadvantages are overcome by the present invention which in essence consists in the addition to and thorough mixing with an almost valueless, finely ground fuel, before burning, of a small quantity of alkaline earth compound such as calcium hydroxide. The ash obtained therefrom can be directly decomposed by means of acid, in particular hydrochloric acid, at boiling temperature under atmospheric pressure.

The complete process of extraction can follow known lines, for example as set forth in our application Serial No. 755,930, by boiling of the ash with hydrochloric acid, filtering, evaporation of the filtrate, heating of the evaporated residue to drive off combined hydrogen chloride, washing to remove calcium chloride, treatment of the residue with soda solution and further washing to remove residue of silica, and re-dissolving of the aluminum oxide in the residue with caustic soda solution. The aluminum hydroxide can now be recovered from the aluminate solution by known processes, for example by crystallization.

A usable fuel is available in the commercially almost worthless waste from the screening and washing plants of hard coal mines. Such waste consists for example of ash-rich slimes, coal dust, bone coal and the like. By suitable mixing of these materials an easily combustible fuel can be obtained, to which, according to the invention, for the production of an easily treatable ash, calcium hydroxide in the form of milk of lime is added.

The admixture of small proportions of calcium hydroxide has the surprising result that 80 to 85% of the aluminum oxide in the ash left after combustion is dissolved by hydrochloric acid at boiling temperature under atmospheric pressure, as compared with 20% under exactly the same conditions if calcium hydroxide is not added to the fuel before combustion.

In order to achieve this result without harmful effect on the furnace, an addition of about 2.5% of calcium hydroxide in the form of milk of lime, calculated on the ash content of fuel, suffices. That such a small quantity of a calcium compound would yield such a result was not to be expected, was unknown hitherto, and is apparently to be explained by some structural change in the compounds.

By way of testing the invention the following experiments were made:

4980 kg. of coal slime of about 20% ash content were well mixed with 25 kg. of calcium oxide in the form of milk of lime, this amounting to 2.5% of the weight of ash, and were then burned under a boiler. The remaining ash was finely ground, concentrated hydrochloric added and brought to boiling point under atmospheric pressure. After this treatment it was found that 80% of the $Al_2O_3$ present had gone into solution.

This experiment was then repeated with the same fuel, without the addition of milk of lime but otherwise under exactly the same conditions. The proportion of $Al_2O_3$ going into solution fell from 80% to about 20%.

The composition of the ash was as follows:

|  | Ash from the fuel to which 2.5% of calcium hydroxide had been added | Ash from the untreated fuel |
|---|---|---|
|  | Percent | Percent |
| $SiO_2+TiO_2$ | 48.10 | 49.20 |
| $Al_2O_3$ | 26.54 | 28.16 |
| $Fe_2O_3$ | 10.78 | 11.23 |
| CaO | 8.9 | 6.70 |
| MgO | 1.82 | 1.76 |
| Alkalies |  | 1.67 |
| Losses at red heat | 3.86 | 1.28 |

This easy decomposition of the ash and the production of cheap energy by the combustion of a commercially almost worthless fuel permit the economic production of aluminum hydroxide and accordingly of aluminum in coal mines.

The process is unchanged if instead of calcium oxide or milk of lime, other calcium compounds are used, for example calcium chloride, calcium carbonate, calcium hydrocarbonate, calcium nitrate, calcium sulphate or calcium phosphate. The same applies if instead of calcium compounds, corresponding quantities of barium, strontium or magnesium compounds are used alone or in mixture.

What we claim is:

1. In a process for the recovery of aluminum compounds from coal, and the combustible waste materials obtained from the washing and screening of coal, the steps which consist in adding and well mixing with the raw material an alkaline earth compound in a proportion the equivalent of approximately 2½% of calcium hydroxide calculated on the ash content of the raw material, burning the mixture at temperatures commonly attained in boiler furnaces, and treating the resulting ash with strongly dissociating acid at boiling temperature under substantially atmospheric pressure.

2. In a process for the recovery of aluminum compounds from coal, and the combustible waste materials obtained from the washing and screening of coal, the steps which consist in adding and well mixing with the raw material milk of lime in the proportion of approximately 2½% calculated on the ash content of the raw material, burning the mixture at temperatures commonly attained in boiler furnaces, and treating the resulting ash with hydrochloric acid at boiling temperature under atmospheric pressure.

LUCIEN FRÉLING.
JULES DORREN.